United States Patent [19]

Landau

[11] 4,288,289
[45] Sep. 8, 1981

[54] STRONG FOCUSING MEGATRON

[76] Inventor: Ronald W. Landau, 1015 Ocean Pkwy., Brooklyn, N.Y. 11230

[21] Appl. No.: 891,602

[22] Filed: Mar. 30, 1978

[51] Int. Cl.³ .............................................. G21B 1/00
[52] U.S. Cl. ..................................................... 176/3
[58] Field of Search ........................... 176/1, 3, 5, 8, 9

[56] References Cited

U.S. PATENT DOCUMENTS

| 2,993,851 | 7/1961 | Thompson et al. | 176/3 |
| 3,009,080 | 10/1961 | Loos | 176/3 |
| 3,491,318 | 1/1970 | Henning et al. | 176/3 |
| 3,614,525 | 10/1971 | Uleski | 176/3 |
| 4,010,396 | 3/1977 | Ress et al. | 176/1 |

FOREIGN PATENT DOCUMENTS

| 5159198 | 11/1974 | Japan | 176/3 |
| 518497 | 12/1974 | Japan | 176/3 |
| 955268 | 4/1964 | United Kingdom | 176/3 |

OTHER PUBLICATIONS

Proceedings of the Utah Academy of Sciences, Arts & Letters, vol. 50, part 2, 1973, pp. 12-18, Fearnley et al.
Proceedings of the Utah Academy of Sciences, Arts & Letters, vol. 50, part 2, 1973, pp. 1-11, Gardner et al.

Primary Examiner—S. A. Cangialosi
Attorney, Agent, or Firm—Hane, Roberts, Spiecens & Cohen

[57] ABSTRACT

A strong focusing megatron has a hollow toroidal chamber in which a plasma of isotopes of hydrogen support an orbital current driven by a changing magnetic field whose amplitude is controllably variable and whose direction is generally coaxial with the major axis (z-axis) of the toroidal chamber while the current is stabilized by a strong focusing magnetic field of alternately focusing and defocusing sections whose field is generally in the region of the toroidal chamber.

15 Claims, 6 Drawing Figures

STRONG FOCUSING MEGATRON

BACKGROUND OF THE INVENTION

This invention pertains to fusion machines and more particularly to improvements in tokamaks.

Tokamaks are machines originally developed by the Russians starting in 1958. After L. A. Artsimovich came to the United States in 1969 and delivered a series of lectures the first American tokamak was built in Princeton in 1970. The goal of these machines is to attain nuclear fusion.

It is known (the Lawson criterion) that such fusion can be attained with a net power release when a plasma which is a fifty percent mixture of deuterium and a fifty percent mixture of tritium with a number density (n) is maintained for a time ($\tau$) so that the combined product is ($5 \times 10^{14}$ atoms/cm$^3 \times 200$ msec $= 10^{14}$ atoms-sec/cm$^3$) and held for this time at a temperature of $100 \times 10^6$ degrees Kelvin. If these two conditions of the number density-time product and the temperature are achieved the amount of electrical energy produced by the fusion of the hydrogen isotopes deuterium and tritium will equal the electrical energy required to produce the plasma. In addition, it is required that heat energy of the plasma be recovered and transformed into electricity at 33% efficiency while the plasma itself is electrically heated at 100% efficiency. It is believed that if the values of the number density-time product and the temperature were increased by only a factor of two or three there would be a large ratio of output power over the input power.

The basic design of a tokamak as given by L. A. Artsimovich comprises a stainless steel chamber filled with deuterium gas at low pressure surrounded by a thick copper wall. Surrounding the toroidal chamber are energized windings to induce a toroidal magnetic field $B_\phi$ of about 20 kG within the chamber. Additionally, another set of energized windings induces a magnetic field $B_E$ directed along an axis which is perpendicular to the plane of the toroidal chamber and which passes through the center of curvature of the torus that defines the chamber. Initially the gas is ionized by radiofrequency signals of about 100 kHz at 20 kW. The magnetic field $B_E$ is linearly increased and adjusted at such a rate so that the external electric field is near 0.2 V/cm to minimize the appearance of runaway electrons. This field drives a plasma current that heats the plasma and rises linearly until the plasma current reaches a value of $I_P = 100$ kA and the discharge duration reaches about 100 msec. The plasma is thereby heated to about $6 \times 10^6$ K.

Various modifications and improvements on such machines were made over the years until in 1975 the Alcator tokamak of MIT achieved the values of: $n = 4 \times 10^{14}$ atoms/cm$^3$; and $\tau = 18$ msec.; $n\tau = 0.7 \times 10^{13}$ atoms-sec/cm$^3$; and $T = 10 \times 10^6$ K.

Lately these values have changed such that n and $\tau$ have increased by about 50% so that $n\tau$ has doubled but T has decreased by about 30%.

Presently, tokamaks are rather close to the desired parameters of $n\tau$ and T. Some scaling laws suggest that the desired values of $n\tau$ will be reached with a $B_\phi$ of about 150 kG because the $n\tau$ product is proportional to $B_\phi^4$. This is about twice the field achieved until now. Such high fields exert tremendous forces. Indeed the 150 kG field exerts a force of 6.5 tons/in$^2$. In the Alcator tokamak the highest fields achieved are about 85 kG which exerts a force $\frac{1}{3}$ of this value. These high fields are technologically achievable, but very expensive to generate. Another problem with present tokamaks is that the plasma pressure contained is somewhat less than 1% of the magnetic pressure. Thus 2 tons/in$^2$ of magnetic pressure contain a plasma pressure of 20 lbs/in$^2$. This is bad not only because of the high capital costs of the magnetic fields, but also because at these low values of $\beta$ (ratio of plasma pressure to magnetic pressure) the dominant loss from the plasma is synchrotron radiation, which has been neglected in obtaining the values of n, $\tau$ and T of the Lawson criterion mentioned above.

Inclusion of this loss due to synchrotron radiation alters the Lawson Criterion to higher values of T and furthermore the fusion power output comes uncomfortably close to the synchrotron radiation output. Thus the margin for inefficiencies is much less. Detailed calculation by many authors has shown that the synchrotron radiation problem is minimal for a $\beta$ of at least 0.1. This value would also minimize the capital cost of a reactor. Thus values of about 20 times the best present tokamak values are needed.

These values are partly related to the main method of heating the plasma, by driving a current of 100,000 A through it. Use of the neutral beam technology provides modest increases in $\beta$, perhaps factors of 2, but larger values seem unlikely.

SUMMARY OF THE INVENTION

It is known that the plasma parameters n, T and $\tau$ are determined mainly by the plasma current. However, the maximum value of such current I in amperes is limited by the Kruskal-Shafranov relation:

$$q \equiv \frac{a}{R} \frac{B_\phi}{B_s} = \frac{5a^2 B_\phi}{IR} \gtrsim 5 \tag{1}$$

where R is the orbital radius and a is the radius of the cross section of the toroidal chamber. Thus, the attainable value of $B_\phi$ limits the maximum value of the plasma current I and consequently the plasma parameters. Instead of using higher toroidal fields $B_\phi$ with all their disadvantages to stabilize the plasma current this invention uses a magnetic field which is weaker than $B_\phi$.

This weaker magnetic field can be obtained from the strong focusing (s.f.) concepts elaborated by Courant et al. in Physical Review of 1952, at page 1190 and by U.S. Pat. No. 2,736,799 of N. Christofilos wherein the strong focusing was used for conventional particle accelerators such as synchrotrons. It should be noted that present tokamaks operate with a weak focusing (w.f.) field which is a cylindrically symmetric magnetic field at the orbit of the plasma current to keep the current channel fixed. This weak focusing field is quite weak, much weaker, for example, than the focusing produced by the magnetic field of the plasma current. This weak focusing magnetic field although sufficient to hold the plasma current channel in place, is not sufficient to stabilize against the Kruskal-Shafranov instability. A strong focusing magnetic field of strength 10 times larger than w.f. field should stabilize a plasma current channel with an aspect ratio R/a 5. Under these circumstances the s.f. force is about equal to the focusing of the current channel magnetic field ($B_s$), for the circulating particles.

Thus, the invention contemplates replacing the toroidal magnetic field of a tokamak with a strong focusing magnetic field. This strong focusing magnetic field is generally localized in the region of the toroidal chamber. To obtain the strong focusing the field itself is azimuthly non-uniform and in fact regularly varies in polarity for different azimuth positions. Such a fusion machine is hereinafter called a S. F. Megatron.

BRIEF DESCRIPTION OF THE DRAWING

Other objects, the features and advantages of the invention will be apparent from the following detailed description when read with the accompanying drawing which shows by way of example not limitation the presently preferred embodiment of the invention. In the drawing.

DESCRIPTION OF THE PREFERRED EMBODIMENT

Figure 1:
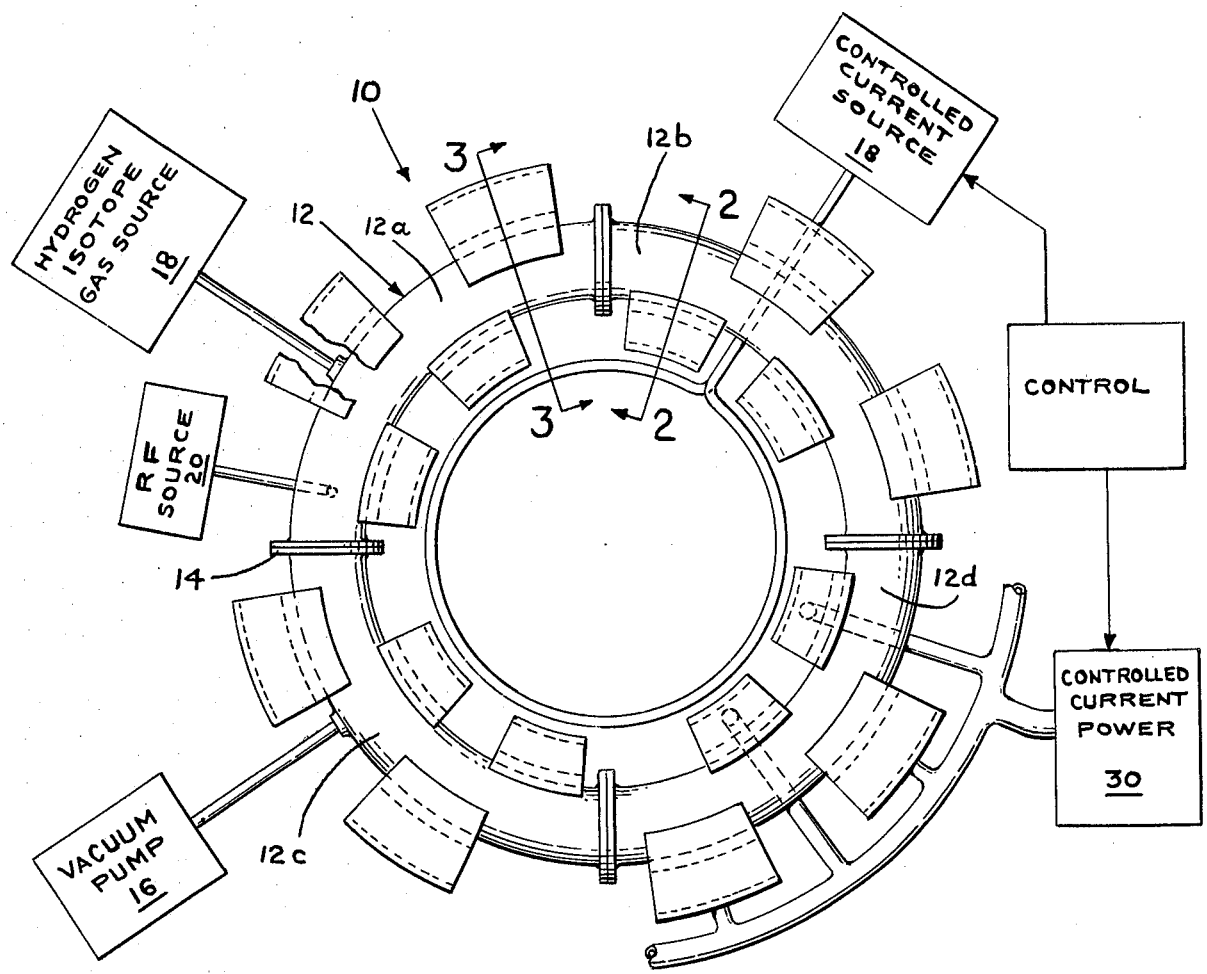
FIG. 1 is a top view partially in schematic of the nuclear fusion system in accordance with the invention

In FIG. 1 there is shown a top view of the fusion machine 10 including a multisection toroidal chamber 12 of preferably circular cross-section. Each of the sections 12a, 12b, 12c, etc. is preferably made of stainless steel having a thickness of about 0.5 mm. The sections are joined together by ceramic rings 14 which provide an air tight seal and electrical isolation between adjacent sections. Typical dimensions for radius R from the axis of revolution C to the median region within the cavity can be about 100 cm and the radius a of a circular cross section of the chamber can be 20 cm. Thus, a desirable form factor or aspect ratio R/a is about five.

Connected to section 12c is a vacuum pump 16 for evacuating the chamber 12 before introducing the hydrogen isotope gas from source 18 connected to section 12a. The gas is preferably a fifty-fifty mixture of tritium and deuterium. Radiofrequency energy source 19 is connected to a large loop on chamber 12 for initially weakly ionizing the gas to provide current carriers.

Positioned within the outline of the toroidal chamber 12 is the solenoid 16. The solenoid 16 has a plurality (about 8000) of turns concentric with the axis of revolution C. The windings have a radius of about 40 cm. and are about 1.25 cm thick and made of super-conducting wires carrying about 40 kA/cm$^2$. The solenoid has a length of about 160 cms symmetrically disposed about the plane of the chamber 12 to provide a substantially axial magnetic field. The solenoid 16 is connected to controlled current source 18 so that when an increasing current (up to about 1 kA) is delivered to the turns, the axial or inducing magnetic field is generated. This increasing magnetic field induces a plasma current which circulates around the chamber according to usual tokamak system. However, this current must be stabilized.

Figures 2, 3:
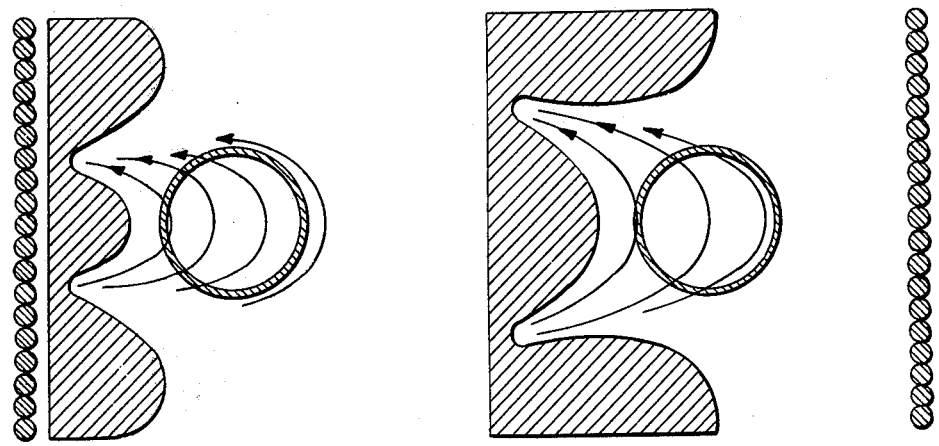
FIG. 2 is a cross-sectional view taken along the line 2—2 of FIG. 1.
FIG. 3 is a cross-sectional view taken along the line 3—3 of FIG. 1.

The stabilization according to the invention is achieved by replacing the usual tokamak toroidal field $B_\phi$ by a strong focusing field. In particular, a special magnetic field is established between two planes which straddle the toroidal chamber 12. This special focusing field is generally in the Z direction and as seen from FIGS. 2 and 3 is alternately bowed concave and convex. The field lines pass through the toroidal chamber from below and exit above it.

Figure 4:
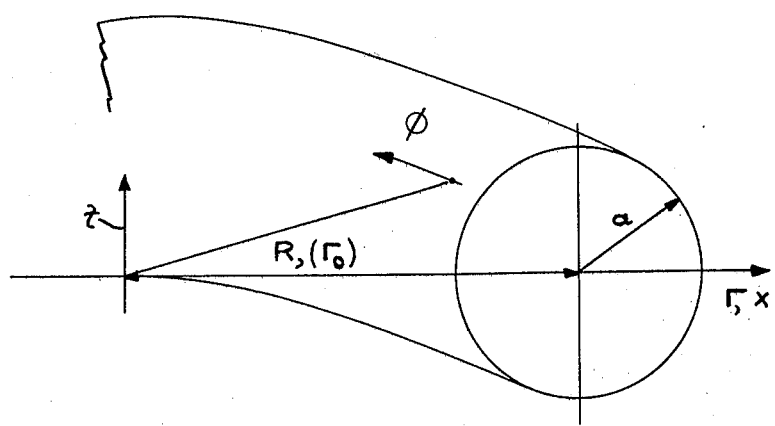
FIG. 4 is a schematic diagram illustrating the reference coordinate system used in establishing magnetic field criteria.

It should be noted that weak focusing by a vertical magnetic field $B_f$ at the location of the plasma channel was used at Princeton ATC tokamak. In the z=zero plane this field is given by.

$$B_z = \left(\frac{r_o}{r}\right)^n B_o \tag{2}$$

where $r_o$ is the equilibrium position of the average circulating particle (see FIG. 4), r the radial coordinate of the particle, $B_o$ the field at the equilibrium position, and n the field index ranging between zero and one. However, this weak focusing field cannot stabilize against the Kruskal-Shafranov instability. To provide such stabilization the field according to the present invention is strong and not uniform in the azimuthal ($\phi$) direction. In fact it periodically varies in amplitude and direction to focus and defocus the circularing particles in their circular orbit in the chamber 12. This strong focusing field is generated by a plurality of pairs of magnet sections 20D and 20F. The number of pairs of sections and the fields established by these sections will now be derived making use of the techniques of Green and Courant in Handbuch der Physik, S. Flugge, ed. Vol. 44, 1949 in conjunction with the coordinate system of FIG. 4. The effective force on an orbiting particle is given by $$F = -m\omega_o^2 \nu^2 x, \quad \omega_o = \frac{eB_o}{mc}, \quad x = r - r_o \tag{3}$$

where m is the mass of the particle, e its charge, $B_o$ is the same as in Eq. (2), and x is the radial deviation of the orbit from the equilibrium position, $r_o$. We now obtain the quantity $\nu$. The ratio of the s.f. to w.f. forces is:

$$\frac{F_{sf}}{F_{wf}} = \frac{\nu^2}{1-n} \simeq 2\nu^2 \tag{4}$$

where $\nu$ is the normalized frequency.

The s.f. force should be larger than the w.f. force and preferably 10× larger. Thus the range $$1 < 2\nu^2 \lesssim 10 \tag{5}$$

exists for $\nu^2$. The general relation $\nu = \mu N/2\pi$ also holds, where N is the number of magnet pairs. At the optimum operating point, $\mu \simeq \pi/2$, giving $\nu \simeq N/4$, so that using the upper limit in Eq. (5), $2\nu^2 \lesssim 10$, one obtains $\nu \lesssim 2.24$ and $N \simeq 4\nu \simeq 8.94$ or N=9, since N must be an integer. With the lower value of $\nu^2$ in Eq. (5) one is led to $N \simeq 2.83$ or N=3. I prefer to use the value N=8 (i.e. 8 magnet section pairs) in the present embodiment, due to the appeal of symmetry, although the system can also work with as few as 3 magnet section pairs. (Note that the minimum number N required to have a strong focusing device is N=1, i.e. only one magnet pair.)

The field index, defined in Eq. (2), is given approximately through $n \simeq N^2/4 = 16$, using the design value $N=8$, noting however that it may be as low as $n \simeq 4.5$ for $N=3$ and lower for $N=1$.

This completes the coarse specification of the number of pairs of magnet sections and the field index. More precise specification is however required to ensure that resonances do not occur among the three frequencies, the axial (z), the radial (x) and azimuthal ($\phi$) which could destroy the beam. These resonances have been worked out by P. A. Sturrock (Ann. of Phys. p. 113; 1958) and by E. D. Courant and H. S. Snyder (Ann. of Phys. p. 1; 1958) and summarized in the Handbuch der Physik article mentioned above. It is shown therein that to avoid resonances between the axial and radial frequencies, one must avoid the values ($\nu_x > 0$, $\nu_z > 0$)

$$\nu_x + \nu_z = k_o \qquad (6)$$

while to avoid the resonances between the axial or radial frequencies and the azimuthal rotation frequency, one must avoid the values $$\nu_x = \frac{k_1}{2}, \nu_z = \frac{k_2}{2} \qquad (7)$$

where the $k_i$ are arbitrary positive integers. Additional resonances arise from consideration of quadratic terms in the equations of motion. These give instability for $$k_1 \nu_x + k_2 \nu_z = k_o, k_1 + k_2 = 3. \qquad (8)$$

For $k_1 + k_2 = 4$ there is possible instability while for $k_1 + k_2 \geq 5$ the system is stable. Again all the $k_i$ are positive integers, but $k_1$ or $k_2 = 0$ is also allowed in Eq. (8). When $\nu_x = \nu_z$ the values of $\nu$ to be avoided, near $\nu \simeq 2$, are from Eqs. (6), (7), and (8)

$\nu = 1.5, 1.667, 1.75, 2., 2.25, 2.333.$

The width $\delta \nu$ for which instability exists, at least for the case of Eq. (7), is roughly $$\delta \nu \simeq \frac{N^{\frac{1}{2}}}{2} \left( \frac{\Delta n}{n} \right). \qquad (9)$$

A convenient value of $\nu$ is, $\nu = 2.13$ so to comfortably avoid the above resonances $\delta \nu < 0.12$ is needed. In the present case with $N=8$ and $n \simeq 16$, this implies $\Delta n/n < 0.09$. For safety, one should require a smaller value, say $\Delta n/n \simeq 3\%$, to avoid the resonances.

Now consider the exact equations for $\nu_x$ and $\nu_z$. These are, $$\nu_x = \frac{\mu_x N}{2\pi}, \cos \mu_x = \cosh \alpha_1 \cos \alpha_2 + \frac{\alpha_1^2 - \alpha_2^2}{2\alpha_1 \alpha_2} \sinh \alpha_1 \sin \alpha_2 \qquad (10)$$

$$\nu_z = \frac{\mu_z N}{2\pi}, \cos \mu_z = \cosh \tilde{\alpha}_1 \cos \tilde{\alpha}_2 + \frac{\tilde{\alpha}_1^2 - \tilde{\alpha}_2^2}{2 \tilde{\alpha}_1 \tilde{\alpha}_2} \sinh \tilde{\alpha}_1 \sin \tilde{\alpha}_2$$

where $$\alpha_1 = \frac{\pi}{N} \sqrt{(n_D - 1)}, \alpha_2 = \frac{\pi}{N} \sqrt{(1 - n_F)}, \tilde{\alpha}_1 = \frac{\pi}{N} \sqrt{(-n_F)}, \tilde{\alpha}_2 = \frac{\pi}{N} \sqrt{n_D} \qquad (11)$$

and typically $n_D >> 1$, $n_F << -1$. It should be noted that $n_D$ is the field index for a defocusing section and $n_F$ the field index for a focusing section. Equation (10) assumes that the D and F magnet sections are equal in length, which tends to be the optimum. Since the chamber of the present system has a rather small aspect ratio, i.e. $R/a \simeq 5$, unlike the typical accelerator values $R/a \simeq 1000$, it may be desirable to make the D magnet sections (with larger fields on the inside) somewhat longer and the F magnet sections (with field larger on the outside) somewhat smaller, to minimize the total field energy. When the sections are of unequal length the $\alpha$ variables are changed to, $$\alpha_1 \to \alpha_1 l, \alpha_2 \to \alpha_2(1-l), \tilde{\alpha}_1 \to \tilde{\alpha}_1(1-l), \tilde{\alpha}_2 \to \tilde{\alpha}_2 l \qquad (12)$$

where $$l = \frac{L_D}{L_D + L_F} \qquad (13)$$

and $L_D$ and $L_F$ are the lengths of the D and F magnet sections respectively.

To obtain $\nu_x = \nu_z$, it is seen from Eqs. (10) and (11) that one must set $$n_D = 1 - n_F. \qquad (14)$$

With this result and the values $\nu = 2.13$, and $N=8$, one finds that $n_D = 16.27$. However a plot of the magnetic field produced by this value of $n_D$, shows that the value of field $B_z$ reverses directions as $|z|$ increases from 0 to 'a' within a toroidal chamber of aspect ratio $R/a = 5$. As this is undesirable, one chooses the lowest field index that maintains the same direction for the field $B_z$. (The field lines will be discussed in more detail hereinafter). This value is somewhat above $n_D = 7$, but I will choose this odd integer value for its convenience, as will be seen later. However, it should be noted that $n_D$ can range between 4.5 and 8. Inserting this value into Eqs. (10), (11) and (14), gives however an imaginary (i.e. unstable) value for $\mu$. One can however recover stability by introducing straight sections, i.e. sections without magnetic field. In addition, different magnet sections are needed to produce the positive and negative field gradients and they thus must be physically separate.

The region where the field falls to zero is approximated as an additional straight section. Each magnet section is now assumed to be a magnet of length $l_m$ (either focusing or defocusing) followed by a field free region (straight section) of length 's'. I now define $\tilde{s} \equiv s/l_m$. The addition of straight sections changes the equations for $\cos \mu_x$ and $\cos \mu_z$. Thus, there must now be added the terms $[\cos \mu_x]_a$ and $[\cos \mu_z]_a$ to the right hand sides of the equations for $\cos \mu_x$ and $\cos \mu_z$, respectively, of Eq. (10). These additive terms are, from J. J. Livingood, p. 204 ('Cyclic Particle Accelerators', D. Van Nostrand, Princeton, N.J.; 1961), $$[\cos \mu_x]_a = \tilde{s}(\alpha_1 \sin h\alpha_1 \cos \alpha_2 = \alpha_2 \cos h\alpha_1 \sin \alpha_2) - (\tilde{s}^2/2)\alpha_1 \alpha_2 \sin h\alpha_1 \sin \alpha_2 = F(\alpha_1, \alpha_2)[\cos \mu_z]_a = F(\tilde{\alpha}_1, \tilde{\alpha}_2). \qquad (15)$$

It is thus found from Eqs. (10), (11), (14) and (15), that when $$\tilde{s} = 0.695, n_D = 7, n_F = -6 \text{ and } N = 8 \qquad (16)$$

the desired value $\nu = 2.13$ is obtained. In this region $\delta \nu \simeq 2 \simeq \tilde{s}$, so that the requirement $\delta \nu < 0.12$ implied by Eq. (9) means that $\delta s \simeq 0.05$ is needed which gives for the necessary accuracy in $\delta s/s = \delta \tilde{s}/\tilde{s} \simeq 7\%$.

There will now be considered the actual shape of the magnet sections required to produce the field indices of Eq. (16). Owing to the required magnet shapes it is difficult and expensive to produce the fields using shaped iron pole pieces with current windings. It is preferred to use current windings on the surfaces formed by rotating the $\vec{B}$ lines in the $\phi$ direction. These surfaces are equivalently, the flux surfaces, i.e. the surfaces of constant flux. In a $\phi$=constant plane, these curves are $$rA_\phi = \text{constant} \tag{17}$$

since $\Phi = 2\pi r A_\phi$ is the flux through a radius r and $A_\phi$ is the vector potential.

Rather than find $A_\phi$ through the solution of $\vec{\nabla} \times \vec{\nabla} \times \vec{A}_\phi = 0$, it is easier to proceed indirectly. First, there is solved the equations $\nabla^2 V = 0$ with $\vec{B} = \vec{\nabla} U$ to obtain the magnetic potential $$V = B_0 \left(\frac{r_0}{r}\right)^n z \left[ 1 - \frac{n^2 z^2}{3! r^2} + \frac{n^2(n+2)^2}{5!} \frac{z^4}{r^4} - \frac{n^2(n+2)^2(n+4)^2}{7!} \frac{z^6}{r^6} + \ldots \right] \tag{18}$$

in cylindrical coordinates for arbitrary 'n'. This result is obtained by applying successively, $\vec{\nabla} \times \vec{B} = 0$ on Eq. (2) to find the next higher order term in $B_r$ and then using $\vec{\nabla} \cdot \vec{B} = 0$ to find the next higher order term in $B_z$. After the series in $B_z$ is established integration gives V. This series converges only for z<r, unless 'n' is a negative even integer, in which case the series is finite.

This expression for V, aside from a constant, may be written in *spherical* coordinates, $\tilde{r}$ and $\theta$, in closed form when m>0 is an odd integer, $$V = \left\{ \tilde{r}^m, \frac{1}{\tilde{r}^{m+1}} \right\} P_m(\cos\theta) \tag{19}$$

where the $P_m$ are the usual Legendre polynomials. Only odd integers are permitted because V, in Eq. (18), is odd in $z = \tilde{r} \cos\theta$. Note the relation between 'n' and 'm', $$m = 1 - n \ (n<0), \ m = n - 2 \ (n>0). \tag{20}$$

Noting that $\vec{B} = \vec{\nabla} \times \vec{A} = \vec{\nabla} V$, one can integrate $B_\theta$ to find $A_\phi$. This gives, again in spherical coordinates ($\tilde{r} \sin\theta = r$), $$A_\phi = \left\{ \frac{\tilde{r}^m}{m+1}, \frac{-1}{m \tilde{r}^{m+1}} \right\} \sin\theta \, P_m'(\cos\theta) \tag{21}$$

also for m>0 and m is an odd integer. One may also obtain the appropriate series in *cylindrical* coordinates by finding $\vec{B}$ through Eq. (18) and then integrating $B_z = (\vec{\nabla} \times \vec{A}_\phi)_z$ in cylindrical coordinates to obtain $A_\phi$. This gives $$A_\phi = -B_0 \left(\frac{r_0}{r}\right)^n r \left( \frac{1}{n-2} - \frac{nz^2}{2!r^2} + \frac{n^2(n+2)}{4!} \frac{z^4}{r^4} - \frac{n^2(n+2)^2(n+4)}{6!} \frac{z^6}{r^6} + \ldots \right) \tag{22}$$

Aside from constants $B_0$ and $r_0$, this expression must be multiplied by the constant $k_m$ where $$k_m = \frac{m^2(m-2)^2(m-4)^2 \ldots 3^2 \cdot 1}{m!} (-1)^{\frac{m-1}{2}} \tag{22A}$$

to obtain Eq. (21). Equation (18) must also be multiplied by the same constant $k_m$ to obtain Eq. (19). One may also use Eqs. (19) or (21) to obtain the appropriate analytic continuation of Eqs. (18) or (22).

There is now seen the utility of choosing $n_D=7$, an odd integer and $n_F=-6$, an even integer. It allows the use of the exact expressions, Eqs. (17) and (21) to calculate the field lines. The appropriate value of 'm' to be used in Eq. (21) is obtained from Eq. (20). Several field lines have been plotted in FIGS. 2 and 3 using Eqs. (17) and (21). The magnetic field itself is however, obtained more easily from the magnetic potential, Eq. (19) than the vector potential, Eq. (21), and is in spherical coordinates $$B_{\tilde{r}} = \left\{ m\tilde{r}^{m-1}, \frac{(m+1)}{\tilde{r}^{m+2}} \right\} P_m(\cos\theta) \tag{23}$$

$$B_\theta = -\left\{ \tilde{r}^{m-1}, \frac{1}{\tilde{r}^{m+2}} \right\} \sin\theta P_m'(\cos\theta)$$

The current required to produce this field is obtained by noting that one may take any field line or better, flux surface, wipe out the magnetic field on one side of it and place a sheet current on the flux surface with magnitude and direction appropriate to produce the desired field jump across the sheet. The required current sheet, K, is given by $$\frac{4\pi K}{c} = \frac{4\pi}{10} K_{amp} = \hat{n} \times \vec{B} \tag{24}$$

where n is a unit vector from the surface into the region with nonzero B and amp signifies that the units of $K_{amp}$ are amperes/cm. Also $K_{amp} = I_{amp}/\Delta l$ where $\Delta l$ is measured along the field line. Since $\hat{n}$ is perpendicular to $\vec{B}$, the direction of $\vec{K}$ is in the $\pm\phi$ direction with its magnitude given by $$K_{amp} = 10 \frac{B}{4\pi} \tag{25}$$

with $$B = \frac{B_0}{k_m} [(1-n)^2 P_m^2 + \sin^2\theta P_m'^2] \left(\frac{r_0}{\tilde{r}}\right)^n \tag{26}$$

where 'm' and 'n' are related as in Eq. (20). There is shown in FIGS. 2 and 3 flux surfaces.

The current sheet may be approximated by discrete currents, each occupying a band of a width $\Delta l = 0.01\, r_0$, where as before, $\Delta l$ is the distance along the field line. (If $r_0 = 1$ meter then $\Delta l = 1$ cm.)

The current variations indicated by Eqs. (25) and (26) may be obtained either by varying the current in each band according to the average value of each band as found by the equations, or by keeping the current constant and varying the band separation or density. The choice between the two methods will depend on the economics or convenience. More detail on the currents will be given below.

Figure 5:
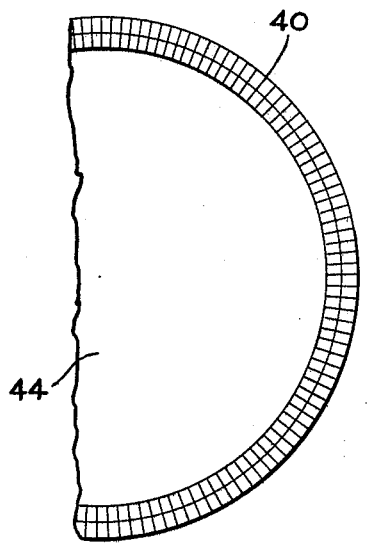
FIG. 5 is an enlarged view of a side of a magnet section.

As seen from FIG. 5 the bands or tapes 40 are fed by a common buss and mounted on a non-conductive form 44.

From FIGS. 2 and 3 it can be seen that the variation of current from winding to winding is in the range 5%–30%, with the larger field and current variations occurring in the 'web' between the lobes. Still, the fineness of this mesh should produce a field gradient error of less than 1% within the torus. Truncating the current sheet at $|\vec{B}| = 3.5$ for the $n_D = 7$ magnet and at $|\vec{B}| = 3.0$ for the $n_F = -6$ magnet should also produce a change of less than 1% in the field index within the toroidal chamber.

The truncation of the flux surface for the windings from the ideal surface, is somewhat arbitrary, but should give a smaller error than demanded by Eq. (9). The choice of flux surfaces is subject to two constraints. One is that they must lie outside the toroidal chamber and the other is that the maximum value of K be as small as possible. Thus in general the flux surfaces should lie as close to the torus as possible. Three lobes are shown in FIGS. 2 and 3, although from Eq. (21) there exist $2m+1$ lobes in the right half plane. Neglect of the other lobes should not unduly perturb the desired field within the toroidal chamber.

The above specification of the field was calculated on the assumption that the field is azimuthally symmetric. This is, of course, not exact, although we do not expect the exact magnetic field to be much different from that shown in FIGS. 2 and 3. However, in any case the field need only be accurate enough so that Eq. (9) be satisfied. The important point is that it has been shown that one can produce magnetic fields with the dependence shown in Eq. (2) over large regions.

Having now specified the values of 'n', N and $\vec{s}$ for the s.f. system, I now specify next the value of $B_0$ in Eq. (2). Its value is the same as in the w.f. case. When $B_0$ is in gauss, r in cms. and I, the plasma current, in amperes, we have $$B_0 = \frac{I}{10 r_0}\left(\ln 8 \frac{r_0}{a} - .2\right) = \frac{gI}{10 r_0} \tag{27}$$

I will describe now the appropriate values of field, $B_E$, whose time rate of change produces $E_\phi$, the toroidal electric field that drives the plasma current. Since the field gradients at the torus have been specified above and are given by a specific set of magnet sections, it is convenient if the field $B_E$ does not perturb this result. This may be done by requiring the field $B_E$ to be zero within the toroidal chamber 12. Such a field is produced by a solenoid 16 of height $h_s = 4 a_s$ where $a_s$ is the radius of the solenoid and equal to 0.4 $r_0$. (The axis of the solenoid is the same as the z axis of FIG. 1). The stray field in the vicinity of the torus could be reduced by increasing the solenoid height, but only at the cost of increased magnetic energy which is proportional to $h_s$, the height of the solenoid. If the stray field is too large with the above solenoid shape, one could use a pair of Helmholz coils near the torus to cancel the stray field.

I next turn to the calculation of the magnitude of the field, $B_E$. The magnetic field in the $z=0$ plane of the solenoid is given by $$B_E = 4\pi n_l \frac{I}{c} = 4\pi n_l \frac{I_E}{10} \tag{1A}$$

where $n_l$ is the number of windings per unit solenoid length and $I_E$ is the solenoid current in amperes. The upward flux in the $z=0$ plane in the solenoid, $\Phi$, is given by $$\phi = B_E(\pi a_s^2). \tag{2A}$$

Since this is the same as the flux through the circle $r = r_0$, the electric field at the torus center (in the $\phi$ direction) is given by $$E = -\frac{10^{-8}}{2\pi r_0}\frac{d\Phi}{dt} = -\frac{10^{-8}}{2 r_0}\dot{B}_E a_s^2, \tag{3A}$$

where E is in volts/cm and the units of B and r are gauss and cm.

Combining Eqs. (1A) and (3A) now gives $$-n_l \dot{I}_E = \frac{10^9 r_0}{2\pi a_s^2} E. \tag{4A}$$

To obtain $\dot{I}_E \simeq \Delta I_E/\Delta t$, I next consider the value of the electric field, E. It should ordinarily be as large as possible to maximize power transfer to the plasma. However when E becomes too large, then many runaways are produced and instabilities are excited that increase the effective collision rate and hence the effective resistance. This causes the plasma to diffuse faster across the magnetic field and decreases the power transfer to the plasma, so that the plasma cools and is lost. The critical field (Dreicer field) above which the number of runaway electrons increases sharply is $$E_c = 7\times 10^{-14} n\Lambda/T \simeq 1.0\times 10^{-12} n/T \tag{5A}$$

where $\Lambda \simeq 15$, n is the plasma density in $cm^{-3}$ and T is the plasma temperature in ev. The initial plasma density, for typical tokamaks, just after the RF preionization, is about $10^{12}/cm^3$ while $T \simeq 1$ ev so that $E_c \simeq 1.0$ v/cm. The induced electric field rapidly completes the ionization so that the density rises to about $10^{13}/cm^2$ while T rises to about 5 ev so that $E_c \simeq 2$ v/cm. It is found experimentally that $$E \simeq 0.15 \text{ v/cm} \tag{6A}$$

is sufficiently low to eliminate the runaway electrons. Although T continues to rise to $\sim 1$ kev, the self-magnetic field of the plasma tends to cancel the applied electric field, so that the actual electric field $E_a$, is only several percent of the applied electric field and $E_a << E_c$ remains true.

Using Eqs. (4A) and (6A) one can find the desired value of $\dot{I}_E$. To obtain the maximum value of $\dot{I}_E$ there is needed a relation connecting it to the plasma current $I_p$.

This may be obtained from the following considerations. In a betatron accelerator equilibrium requires that the average magnetic field $\bar{B}_E$, within the average particle radius $r_0$, be twice the field at r, i.e. $\bar{B}_E = 2B_0$. In a tokamak one would expect a larger value of $\bar{B}_E$ in order to compensate both for the cancelling effect of the self-field and the loss of angular momentum due to collisions. Remarkably, the additional factor for $\bar{B}_E$, or equivalently the magnetic flux, is only twice what it is in the Betatron. This is experimentally observed and is due to the fact that the self-field almost cancels the applied field, as will be seen hereinafter. Thus for the tokamak $$\bar{B}_E = 4B_0 \tag{7A}$$

while from Eqs. (1A) and (2A), $$\bar{B}_E = \frac{\Phi}{\pi r_0^2} = B_E \frac{a_s^2}{r_0^2} = \frac{4\pi}{10} n_l I_E \frac{a_s^2}{r_0^2}. \tag{8A}$$

Inserting this result into Eq. (7A) and the value of $B_0$ from Eq. (27) gives the desired result $$-n_l I_E = \frac{gr_0}{\pi a_s^2} I_p \simeq 2.5 \frac{I_p}{a_s} \tag{9A}$$

using the typical values, $g \simeq 3$, $r_0/a_s = 2.5$. If, further $a_s \simeq 0.4$ m and $I_p \simeq 10^6$ amps, as is preferable for a fusion reactor, then $$n_l I_E \simeq 25 \text{ kamps/cm.} \tag{10A}$$

Since a 1 cm diameter wire can carry 1 kamp (with the aid of some cooling water) this implies that one needs 25 turns per cm, i.e. the number of turns on the solenoid must be 25 deep. Using superconductors would of necessity decrease the thickness of the solenoid.

I now determine the time $\Delta t$, that the linearly increasing solenoid current must be maintained. To find it I insert the result, Eq. (9A) into Eq. (4A) to obtain $$\dot{I}_p = \frac{10^9}{2g} E \simeq 2.5 \times 10^7 \text{amps/sec} \tag{11A}$$

using also the value of E from Eq. (6A). With the largest present day machines where $I_p \simeq 1. \times 10^5$ amps, this implies that $\Delta t = I_p/\dot{I}_p \simeq 4$ msecs while for a fusion reactor where $I_p \simeq 10^6$ amps, $\Delta t \simeq 40$ msecs. (Note that Eq. (11A) is equivalent to $V = -L\dot{I}_p$ where L is the inductance, $L = 4\pi r_0 g/c^2$ in cgs units, so that $V + E(2\pi r_0) \simeq 0$ and the changing current tends to cancel most of the applied field.) From the linear relation of Eq. (9A) the rise time, $\Delta t$ of the solenoid and plasma currents, is the same and is so shown in FIG. 7.

To obtain a net fusion energy production, as mentioned above, a containment time $\Delta t_c \simeq 200$ msecs is necessary. Multiplying this by 2 to obtain a comfortable margin, gives $\Delta t_c \simeq 400$ msecs for the second or plateau phase. This is about 10× the duration of the first phase, the time required for the plasma current to reach the desired value of 1 million amperes. The electric field needed for this second phase is roughly proportional to the ratio of the two times, and is given by $$E \simeq .15 \frac{40}{400} = .015 \text{ v/cm.} \tag{12A}$$

Figure 6:
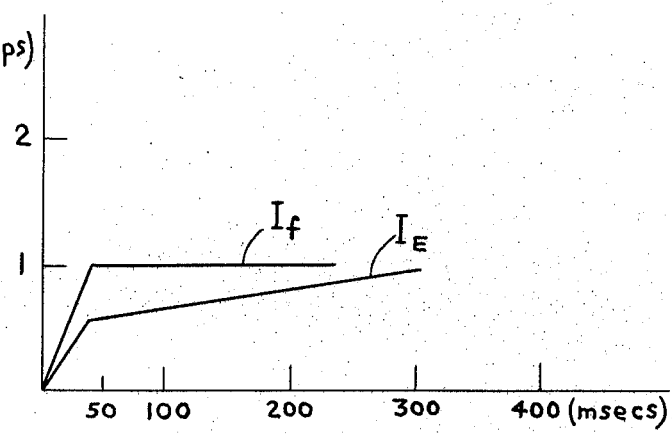
FIG. 6 is a graph showing the build up of currents as a function of time for establishing the plasma current and the focusing fields.

Thus in FIG. 6, the current increment in the second phase, from 40 to 400 msecs equals the current increment, $\Delta I_E$ in the first phase from 0 to 40 msec and the final current in the solenoid coil, $I_E$ is twice that obtained from Eq. (10A) so that $n_l I_E \simeq 50$ kA.

I now calculate the explicit numbers for the current required to produce the alternating gradient fields of FIGS. 2 and 3, for the specific parameters $$r = 100 \text{ cms, } I_p = 10^6 \text{ amps.} \tag{1B}$$

From Eqs. (24), (25) and (26)

$$I = \Delta l \frac{10}{4\pi} B_0 b \tag{2B}$$

where $$b = \frac{[(1-n)^2 P_m^2 + \sin^2\theta \, P'^2_m]^{\frac{1}{2}}}{k_m} \left(\frac{r_0}{r}\right)^n \tag{3B}$$

The value of $B_0$ is obtained from Eq. (27) using the data of Eq. (1B), giving $$B_0 = \frac{gI}{10r_0} \simeq \frac{3 \times 10^6}{10 \times 10^2} = 3 \times 10^3 \, G \tag{4B}$$

while for the spacing $\Delta l$ we use $\Delta l = 0.01 r_0 = 1$ cm.

By way of example I now calculate the current needed on the surface of the coil lobe of FIG. 3, at the point $r = 0.725 \, r_0$, $z = 0$, labelled $|\vec{B}| = 1$ in the Figure. Since $\theta = \pi/2$, and $n = 7$ then $P_5 = 0$, while $P'_5/k_5 = 1$ so that from Eq. (3B)

$$b = 9.50. \tag{5B}$$

Combining this with Eqs. (2B) and (4B) gives the current $$I = \frac{10}{4\pi} B_0 (9.50) \simeq 23 \times 10^3 \text{ amps.} \tag{6B}$$

Since the current is proportional to $|\vec{B}|$, the current at others points of the coil can be similarly calculated.

Since a 1 cm² area wire can carry a steady current of about 0.5 kA, with water cooling (e.g. PLT tokamak toroidal coils) we see that the surface current winding must be 46 cms deep. This is however too large for the scale of the coil shape in FIG. 3 and one must go to superconducting coils that can carry much higher currents $\sim 40$ kA/cm² (manufactured by Vacuumschmelze Hanau, Phys. Today July '77, p. 38). The current winding is then only 0.6 cms deep at $z = 0$ and 2.0 cms deep at the web where $|\vec{B}|$ is 3.5× larger. This current thickness is sufficiently small to approximate the current sheet of the coil form of FIG. 3.

It is also possible to use normal conductors if the scale length $r_0$ is increased considerably, at least a factor of 3. This decreases $B_0$ through Eq. (4B) and increases the scale of FIG. 3 by the same factor. Hence the effective current winding depth is reduced by a factor of $3^2$. The choice of normal or superconductor must rest solely on the economics of the situation. The currents for the solenoid 16 are generated by controlled current source 18 under control of controller 19 to produce the current waveform $I_E$ of FIG. 5. The currents for windings of the focusing magnets are generated by controlled current source 30 under control of controller 19 to produce the current waveform $I_f$ of FIG. 5. The energy for generating these currents can be stored in electrolytic capacitors or in large flywheels that drive commercial electric generators.

It should be noted that by using the strong focusing as described above $\beta$ is greater than unity and therefore much greater than the required minimum value 0.1. Thus the strong focusing megatron of the present invention gives quite large values of $\beta$ for synchrotron radiation, large enough to neglect the effect of this radiation on the power balance of a tokamak and hence this s.f. megatron will allow the construction of an economic fusion reactor.

What is claimed is:

1. A fushion machine comprising a hollow toroidal chamber, a gas of ionized isotopes of hydrogen in said chamber, means for establishing an inducing magnetic field whose amplitude is controllably variable and which has a component perpendicular to the plane of said hollow toroidal chamber and said component being coaxial with the axis of revolution of said hollow toroidal chamber so that an increasing circular plasma electric current is induced in said hollow toroidal chamber as said inducing magnetic field increases, and generating means for generating a strong focusing magnetic field whose amplitude is controllably variable to be proportional to the plasma current and which is toroidally disposed about said axis of revolution and enters on one side of said hollow toroidal cylinder, passes through said hollow toroidal chamber and exits on the other side of said hollow toroidal cylinder in a direction parallel to said axis of revolution.

2. The fusion machine of claim 1 wherein the strong focusing magnetic field varies along a path traced azimuthally about its cylindrical periphery.

3. The fusion machine of claim 2 wherein the strong focusing magnetic field periodically varies along said azimuthal path.

4. The fusion machine of claim 3 wherein the flux lines of the strong focusing magnetic field periodically varies between convex and concave bowing along said azimuthal path.

5. The fusion machine of claim 4 wherein the amplitude of the strong focusing magnetic field varies in synchronism with the amplitude of the inducing magnetic field.

6. The fusion machine of claim 4 wherein said strong focusing generating means comprises a plurality of pairs of magnet sections in operative proximity with said toroidal chamber.

7. The fusion machine of claim 4 wherein the number of pairs of magnetic sections range between 3 and 8.

8. The fusion machine of claim 4 wherein adjacent magnetic sections are on opposite sides of said toroidal chamber.

9. The fusion machine of claim 8 wherein adjacent magnetic sections are separated by an air gap.

10. The fusion machine of claim 9 wherein the length of the air gap is between 50% and 80% of the length of a magnet section.

11. The fusion machine of claim 4 wherein alternate magnet sections are focusing sections and the intervening magnet sections are defocusing sections.

12. The fusion machine of claim 11 wherein each defocusing section has a field index $n_D$ in the range of 4.5 to 8.

13. The fusion machine of claim 12 wherein the field index $n_D$ equals 7.

14. The fusion machine of claim 12 wherein each focusing section has a field index $n_F = 1 - n_D$.

15. The fusion machine of claim 6 wherein said magnet sections are arrays of current conductors aligned parallel to the azimuthal of the toroidal chamber.

* * * * *